(12) United States Patent
Arceo

(10) Patent No.: US 10,240,954 B2
(45) Date of Patent: Mar. 26, 2019

(54) INDICATING DEVICE WITH REAR PROJECTION STRUCTURE

(71) Applicants: DENSO International America, Inc., Southfield, MI (US); DENSO CORPORATION, Kariya, Aichi-pref. (JP)

(72) Inventor: Marc Arceo, Livonia, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 87 days.

(21) Appl. No.: 15/149,302

(22) Filed: May 9, 2016

(65) Prior Publication Data

US 2017/0322056 A1 Nov. 9, 2017

(51) Int. Cl.
| G01D 11/28 | (2006.01) |
| G01D 13/02 | (2006.01) |
| F21V 11/12 | (2006.01) |
| B60K 35/00 | (2006.01) |
| B60K 37/02 | (2006.01) |

(52) U.S. Cl.
CPC ............ *G01D 13/02* (2013.01); *B60K 35/00* (2013.01); *B60K 37/02* (2013.01); *F21V 11/12* (2013.01); *B60K 2350/206* (2013.01); *B60K 2350/2039* (2013.01); *B60K 2350/2095* (2013.01); *B60K 2350/403* (2013.01)

(58) Field of Classification Search
CPC ............................... G01D 13/28; G01D 13/02
USPC ........................... 362/23.15, 26–30
See application file for complete search history.

(56) References Cited

U.S. PATENT DOCUMENTS

| 4,258,643 A * | 3/1981 | Ishikawa ............... G01D 11/28 116/286 |
| 4,300,470 A * | 11/1981 | Furukawa ............. G01D 13/22 116/288 |
| 5,842,435 A * | 12/1998 | Tsukamoto ........... G01D 11/28 116/26 |
| 6,598,988 B1 * | 7/2003 | Noll ..................... G01D 11/28 116/284 |
| 7,270,434 B2 * | 9/2007 | Obata ................... G01D 11/28 362/23.13 |
| 7,624,699 B2 * | 12/2009 | Harada ................. G01D 13/265 116/286 |
| 7,665,857 B2 * | 2/2010 | Harada ................. G01D 11/28 116/288 |
| 9,909,906 B2 * | 3/2018 | Horvath ................ G01D 13/04 |
| 2003/0079672 A1 * | 5/2003 | Kalashnikov ......... G01D 11/28 116/288 |
| 2009/0038535 A1 * | 2/2009 | Morales ................ G01D 11/28 116/288 |
| 2013/0314891 A1 * | 11/2013 | Miyazawa ........... G01D 13/265 362/23.14 |
| 2016/0245675 A1 * | 8/2016 | Hamalainen ......... G01D 13/265 |
| 2017/0115140 A1 * | 4/2017 | Arceo ................... G01D 13/04 |
| 2017/0241816 A1 * | 8/2017 | Simpson .............. G01D 13/28 |

* cited by examiner

*Primary Examiner* — Daniel St Cyr

(57) ABSTRACT

A dial plate being nonopaque is in a disc shape. A slit member has slits each extending through the slit member in a thickness direction. A light source is located on an opposite side of the slit member from the dial plate. The light source is configured to emit light through the slits of the slit member toward the dial plate to project images on the dial plate.

13 Claims, 9 Drawing Sheets

INDICATING DEVICE WITH REAR PROJECTION STRUCTURE

TECHNICAL FIELD

The present disclosure relates to an indicating device with a rear projection structure.

BACKGROUND

Conventionally, a vehicle may be equipped with an indicating device such as a speedo meter and/or an engine revolution meter. An indicating device may have a structure to produce a displaying effect by employing a projection optical structure.

SUMMARY

According to an aspect of the preset disclosure, a dial plate may be nonopaque and may be in a disc shape. A slit member may have slits each extending through the slit member in a thickness direction. A light source may be located on an opposite side of the slit member from the dial plate. The light source may be configured to emit light through the slits of the slit member toward the dial plate to project a plurality of images on the dial plate.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

As follows, an indicating device 1 will be described with reference to drawings. In drawing(s), "VERTICAL" may correspond to a vertical direction. "AXIAL" may correspond to an axial direction. "RADIAL" may correspond to a radial direction. "CIRCUMFERENTIAL" may correspond to a circumferential direction.

Figure 1:
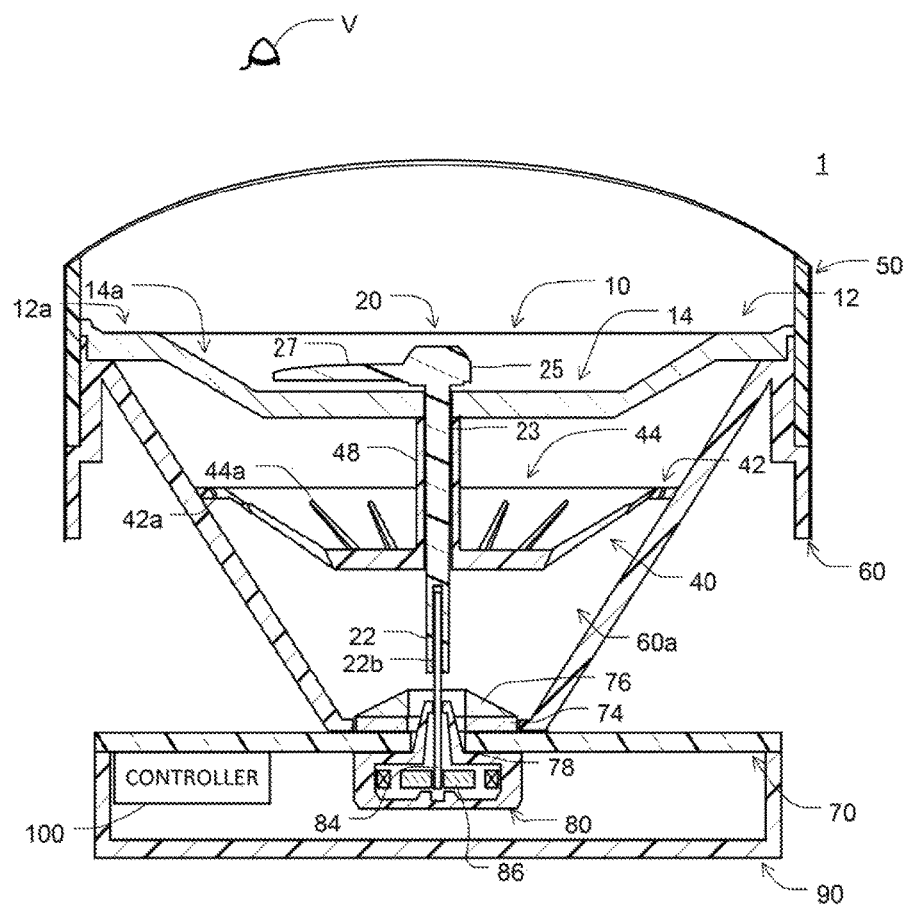
FIG. 1 is a sectional view showing an indicating device of a first embodiment.
Figure 1:
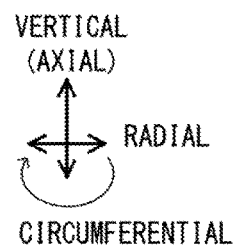
Figure 2:
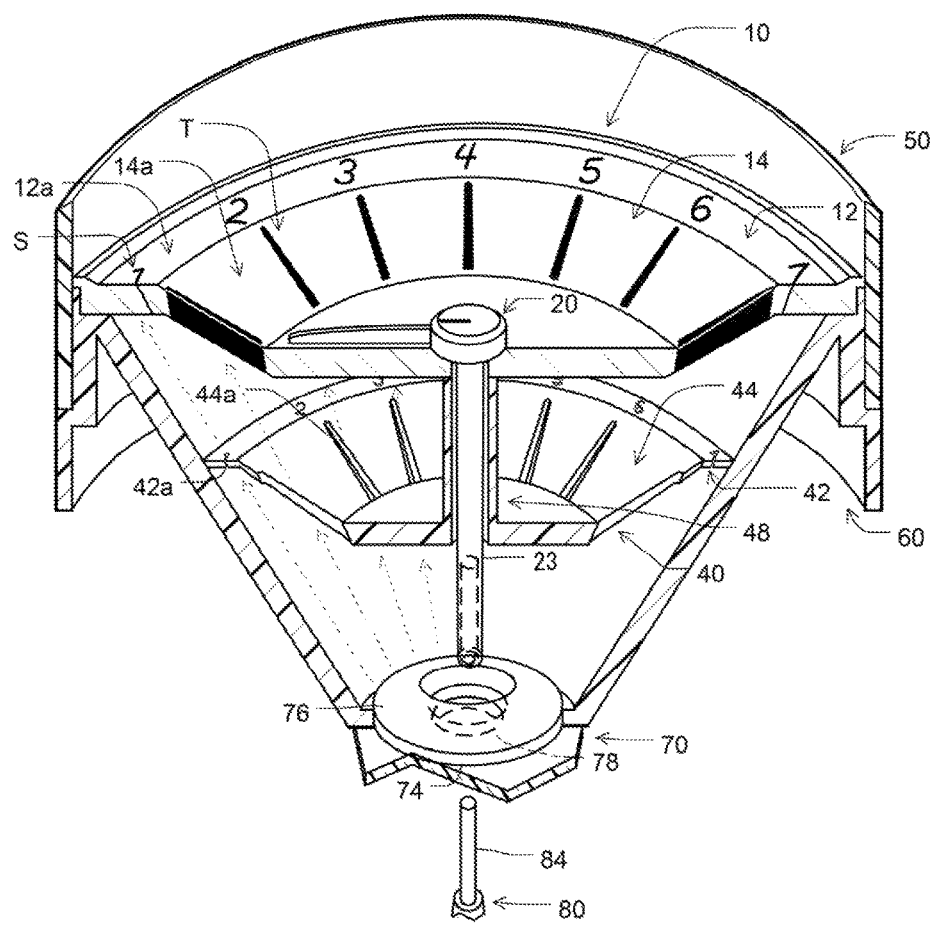
FIG. 2 is a partial perspective view showing a part of the indicating device.

As shown in FIGS. 1 and 2, the indicating device 1 is, for example, an engine revolution meter for an automobile. The indicating device 1 includes a dial plate 10, a pointer 20, a slit member 40, a dial cover 50, a housing 60, a printed circuit board (PCB) 70, a driver unit 80, a rear cover 90, and a controller 100.

The dial plate 10 has a display surface facing a viewer V such as an occupant of an automobile. The dial plate 10 is in a disc shape when viewed from the viewer V. The dial plate 10 is, for example, a nonopaque plate formed of a nonopaque material such as acrylic resin or polycarbonate resin. The dial plate 10 may have a frosted surface or a smoked surface.

The dial plate 10 includes a dial brim 12 and a dial center 14. In the present example, the dial brim 12 and the dial center 14 are integrally formed of a nonopaque material. The dial brim 12 is in a ring shape and forms a symbol region 12a. The dial brim 12 is nonopaque at least in the symbol region 12a. The dial center 14 is in a dented disc shape and forms a tick-mark region 14a. The dial center 14 is nonopaque at least in the tick-mark region 14a. The dial center 14 is located on the radially inside of the dial brim 12.

The symbol region 12a is nonopaque and is in a ring shape. The symbol region 12a is located on the radially outside of the tick-mark region 14a. The tick-mark region 14a is nonopaque and is in a disc shape. In the present example, the tick-mark region 14a is formed in a dented inclined periphery of the dial center 14. The dented inclined periphery is in a chamfered conical shape.

The pointer 20 is located at a center of the dial plate 10. The pointer 20 is rotational relative to the dial plate 10. The pointer 20 includes a pointer shaft 23, a pointer body 25, and a needle 27. In the example, the pointer shaft 23, the pointer body 25, and the needle 27 are integrally formed of an opaque material such as ABS resin. The pointer shaft 23 extends from the pointer body 25 downward in the drawing. The pointer shaft 23 is coaxial with the dial plate 10 and the slit member 40. The pointer shaft 23 has a pointer end 22 in the axial direction.

The PCB 70 is located between the housing 60 and the rear cover 90. The PCB 70 has a center hole 78 at its center. The PCB 70 is further equipped with a light emitting diode (LED, light source) 74. The LED 74 is located around the center hole 78. The PCB 70 may be equipped with electronic wirings and electronic devices such as the controller 100. The controller 100 may be a microcomputer including a CPU, a storage unit such as a RAM and ROM, which are connected with each other via an internal bus. The controller 100 may be configured to execute a computer program to implement various processings thereby to control components such as the LED 74.

The driver unit 80 is equipped to the PCB 70. For example, the driver unit 80 may be soldered to the PCB 70. The driver unit 80 may be an electric motor such as a stepper motor. The driver unit 80 includes a drive shaft 84 and a motor portion 86. The drive shaft 84 is coupled with a rotor of the motor portion 86. The motor portion 86 includes a stator configured to receive electricity from the controller 100 via the wiring of the PCB 70 to generate a magnetic field and to drive the drive shaft 84 via the rotor. The driver unit 80 may be equipped with reduction gears combined with the motor portion 86. The rear cover 90 is equipped to the PCB 70 to accommodate the driver unit 80.

The pointer end 22 of the pointer shaft 23 has a drive shaft hole 22b into which the drive shaft 84 is inserted. Thus, the drive shaft 84 is coupled with the pointer shaft 23.

The housing 60 is a hollow component in a conical shape. The housing 60 may be formed of an opaque material such as ABS resin. The housing 60 has an opening covered with the dial plate 10. The housing 60 has a conical hollow 60a accommodating the slit member 40 and the LED 74. The pointer shaft 23 and the drive shaft 84 extend into the conical hollow 60a, such that the pointer shaft 23 and the drive shaft 84 are coupled to each other. The housing 60 has an inclined wall, which may at an angle along optical axis from the LED 74. The conical hollow 60a of the housing 60 may form a projection space to prohibit leakage of light to the outside. The dial cover 50 is a tubular member. The dial cover 50 is mounted to the dial plate 10 and the housing 60 to be located coaxial with the dial plate 10.

The slit member 40 is, for example, an opaque component in a dented disc shape. In the present example, the slit member 40 has a brim portion 42 in a flat disc shape and has a conical portion 44 dented in a chamfered conical shape. In the example, the slit member 40 has a tube portion 48 extending upward in the drawing toward the dial plate 10. The tube portion 48 is connected with the rear side of the conical portion 14 of the dial plate 10, such that the slit member 40 is suspended from the dial plate 10. The tube portion 48 has a through hole through which the pointer shaft 23 extends. The slit member 40 is further supported at the brim portion 42 on the inner surface of the housing 60. In the present structure, the dial plate 10, the pointer shaft 23, and the slit member 40 are located coaxial with each other.

The conical portion 44 of the slit member 40 has multiple tick-mark slits 44a. Each of the tick-mark slits 44a is a through hole extending through the conical portion 44 in the thickness direction. The tick-mark slits 44a are arranged at angular intervals in the circumferential direction. Each of the tick-mark slits 44a is in a linear shape extending radially outward. In the example, the tick-mark slit 44a is in a tapered shape reducing in width radially outward.

The brim portion 42 of the slit member 40 has multiple symbol slits 42a. Each of the symbol slits 42a extends through the brim portion 42 in the thickness direction. The symbol slit 42a is in a shape representing a corresponding symbol. Specifically, the symbol slit 42a has an outline exhibiting the corresponding symbol. The symbol slits 42a are arranged at angular intervals in the circumferential direction. In the present example, the symbol slits 42a are located correspondingly to the tick-mark slits 44a. More specifically, each of the symbol slits 42a is located on the radially outside of corresponding one of the tick-mark slits 44a.

The LED 74 is located on the opposite side of the slit member 40 from the dial plate 10. In the example, the LED 74 is in a ring shape and is configured to emit light in a ring shape. The LED 74 may be an LED cluster including multiple small LED elements arranged in a ring shape. The LED 74 is coaxial with the slit member 40, the dial plate 10, and the pointer shaft 23. The LED 74 is located on the radially outside of the drive shaft 84 to surround the drive shaft 84. The LED 74 is positioned on the PCB 70, such that a rear side of the slit member 40 is opposed to optical axes 74a (FIG. 3) of the LED 74. The LED 74 emits a ring-shaped light along the axial direction.

A light conductor 76 is equipped to the front surface of the LED 74. The light conductor 76 is formed of a nonopaque material such as a polycarbonate resin. The light conductor 76 is in a ring shape protruded at the center to form an inclined conical surface. The light conductor 76 directs light emitted from the LED 74 radially outward toward the slits 42a and 44a of the slit member 40. In the present configuration, the LED 74 is configured to emit light through the light conductor 76 and the slits 42a and 44a of the slit member 40 toward the dial plate 10 to project multiple images on the dial plate 10.

In FIG. 2, the pointer 20 is connected with the drive shaft 84 of the driver unit 80 through the center hole 78 of the PCB 70. The drive shaft 84 is located to be coaxial with the pointer shaft 23. After the connection, the drive shaft 84 extends through the PCB 70. In an actual structure, the driver unit 80 and the LED 74 may be soldered to the PCB 70 in advance. The light conductor 76 may be adhered to the front side of the LED 74. The slit member 40 and the dial plate 10 may be equipped to the housing 60. The components 40, 10, and 60 may be equipped to the PCB 70. The pointer 20 may be finally equipped to the drive shaft 84 through the dial plate 10.

The indicating device 1 is configured to project images to form a gauge meter. Specifically, the tick-mark region 14a is configured to project tick marks T. The symbol region 12a is configured to project symbols S. The tick marks T may form a gauge meter of the indicating device 1. The symbols S may be numbers denoting the engine revolution. The symbols S may be formed correspondingly to the tick marks T.

The LED 74 is opposed to the rear side of the slit member 40. The slit member 40 is enabled to receive light, which is emitted from the LED 74, and to cause the light to pass through the slits 42a and 44a toward the dial plate 10. Thus, the dial plate 10 is enabled to project images including the tick marks T and the symbols S. The tick marks T are formed by projecting the tick-mark slits 44a on the tick-mark region 14a of the dial plate 10. The symbols S are formed by projecting the symbol slits 42a on the symbol region 12a of the dial plate 10.

The drive shaft 84 is coupled with the pointer shaft 23 of the pointer 20 to manipulate the pointer 20. The drive shaft 84 enables to direct the pointer 20 at an appropriate position relative to the tick marks T and the symbols S on the dial plate 10.

Figure 3:
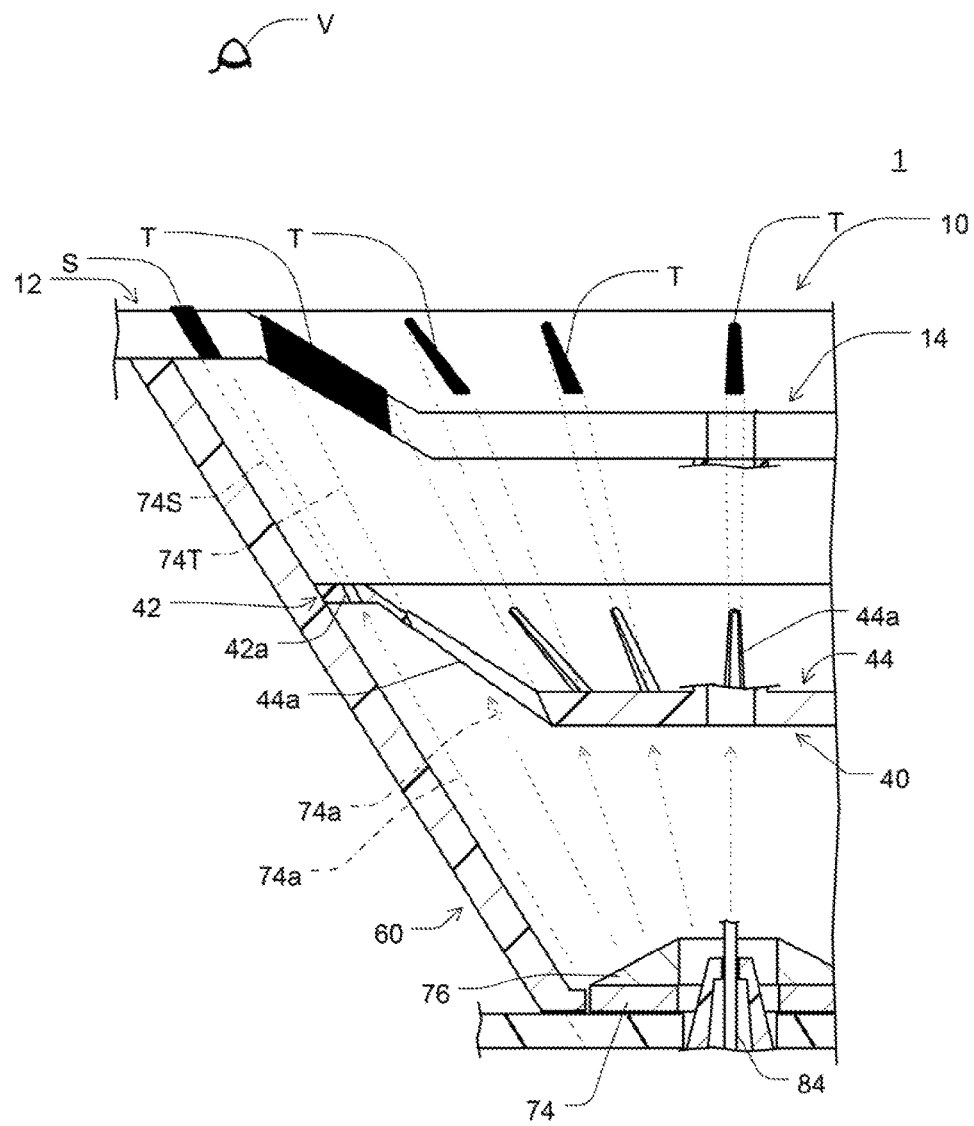
FIG. 3 is an explanatory view showing an interior of the indicating device.

As shown in FIG. 3, when the LED 74 is energized, the LED 74 emits light along optical axes 74a. A certain optical axis 74a passes through the symbol slit 42a of the slit member 40 to form a light flux 74S. The light flux 74S extends toward the dial plate 10 to project the symbol S on the dial plate 10. A certain optical axis 74a passes through the tick-mark slit 42a of the slit member 40 to form a light flux 74T. The light flux 74T extends toward the dial plate 10 to project the tick mark T on the dial plate 10. In this way, the light from the LED 74 passes through the slits 42a and 44a of the slit member 40 toward the dial plate 10, and the light reaching the dial plate 10 causes projection of the images including the symbols S and the tick marks T on the dial plate 10.

In other words, a remaining portion of the slit member 40 excluding the slits 42a and 44a creates a shadow on the dial plate 10 thereby to create the images including the symbols S and the tick marks T. The projected illumination of the tick marks T and the symbols S are rendered viewable for the viewer V.

The controller 100 (FIG. 1) may control energization of the LED 74 to adjust intensity of light emitted from the LED 74. Specifically, as the controller 100 reduces or increases an electric power supplied to the LED 74, the pointer 20 reduces or increases intensity of light emitted therefrom. In this way, the controller 100 controls intensity of indication of the tick marks T and symbols S.

Figure 4:
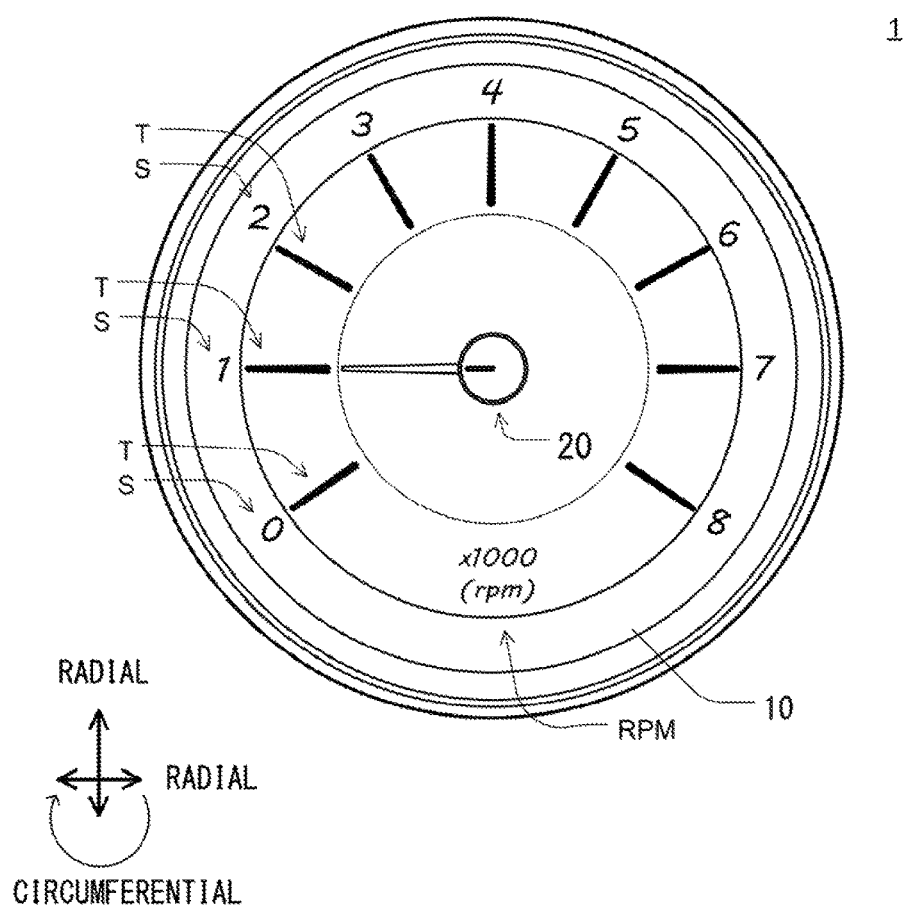
FIG. 4 is a plan view showing the indicating device when a light source is activated.

As shown in FIG. 4, when the controller 100 activates the LED 74, the dial plate 10 projects the tick marks T and the symbols S. In the example, the dial plate 10 further projects an additional image RPM representing letters of "×1000 (rpm)." The slit member 40 (FIG. 1) has an additional slit corresponding to the additional image RPM. The additional slit of the slit member 40 passes light from the LED 74 therethrough to enable projection of the additional image RPM on the dial plate 10.

Figure 5:
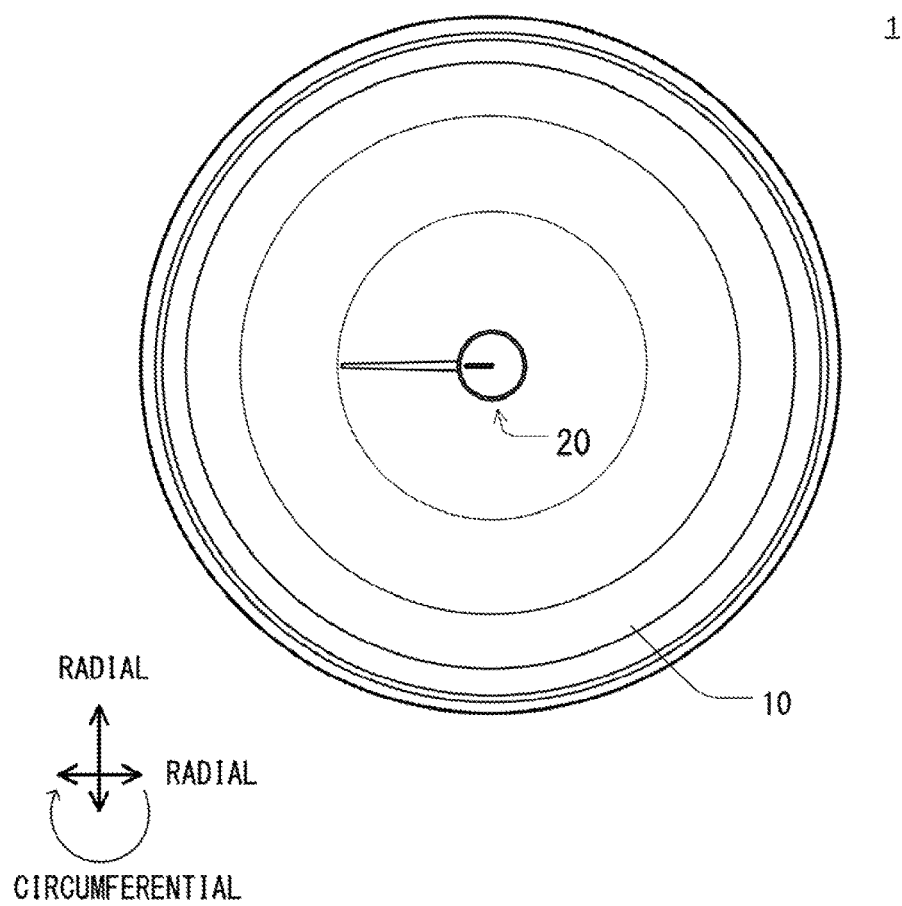
FIG. 5 is a plan view showing the indicating device when the light source is de-activated.

As shown in FIG. 5, when the controller 100 deactivates the LED 74, the tick marks T and the symbols S disappear from the dial plate 10. In this state, the dial plate 10 exhibits its flat surface showing a blank image.

Second Embodiment

Figure 6:
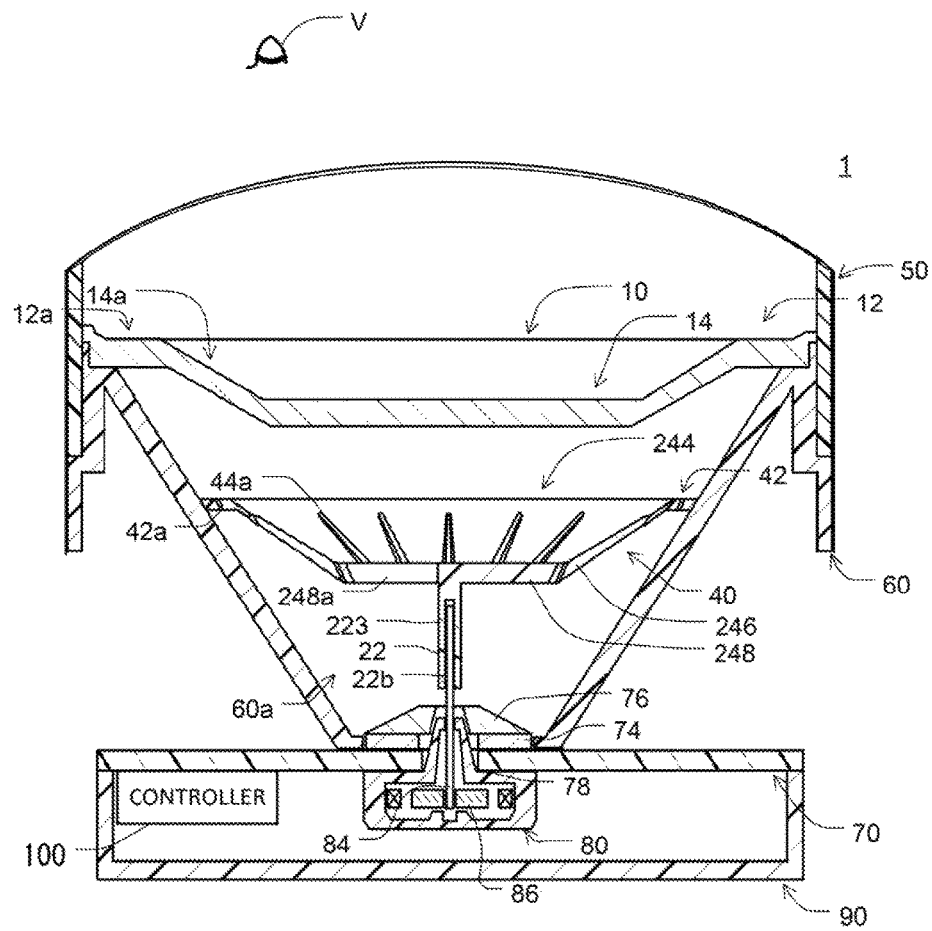
FIG. 6 is a sectional view showing an indicating device of a second embodiment.
Figure 7:
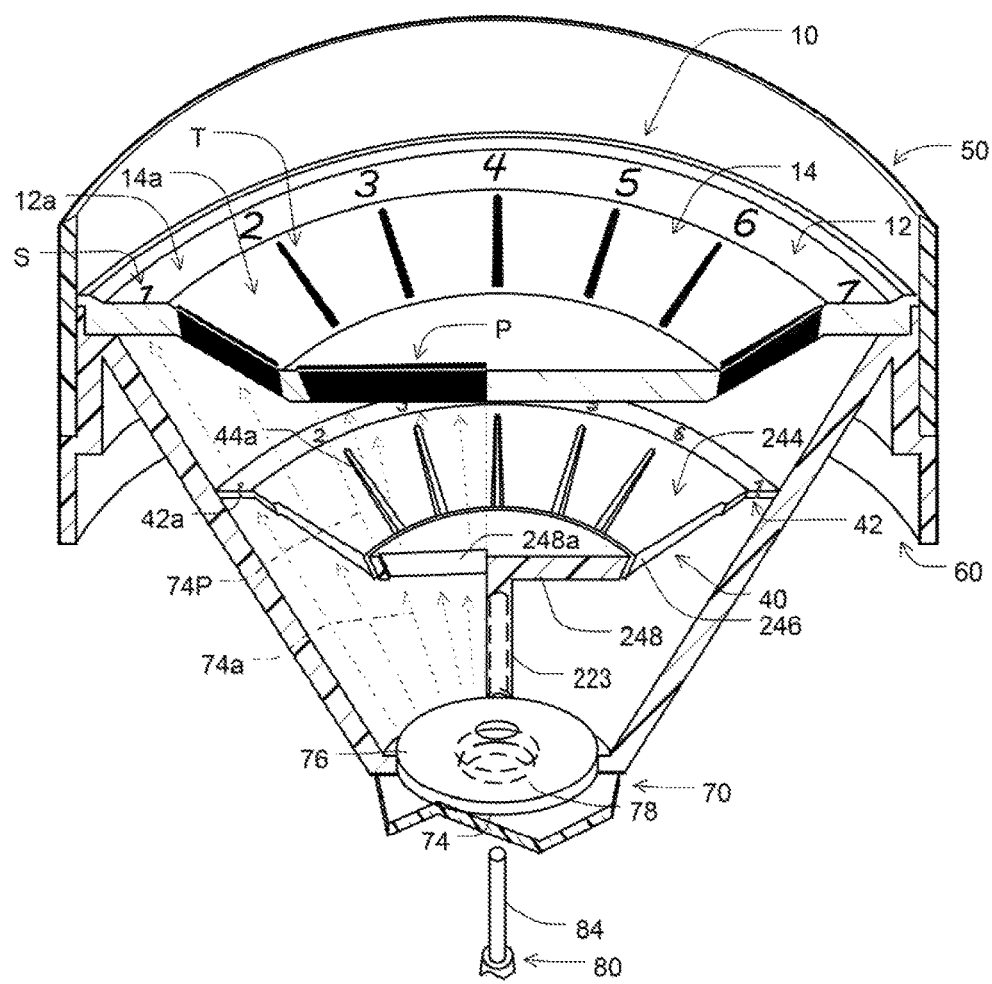
FIG. 7 is a partial perspective view showing a part of the indicating device of the second embodiment.

As shown in FIGS. 6 and 7, according to the present embodiment, a conical portion 244 of the slit member 40 includes a ring slit member 246 and a pointer slit member 248. The ring slit member 246 is located on the radially outside of the ring slit member 246. The ring slit member 246 is affixed to the housing 60. Therefore, the ring slit member 246 is stationary relative to the housing 60 and the dial plate 10. The pointer slit member 248 includes a slit member shaft 223 extending from a bottom side of the pointer slit member 248 downward in the drawing. The slit member shaft 223 is coupled with the drive shaft 84 of the driver unit 80, such that the pointer slit member 248 and the slit member shaft 223 are coaxial with the dial plate 10. In the present structure, the pointer slit member 248 is rotational relative to both the ring slit member 246 and the dial plate 10. The driver unit 80 is configured to drive the pointer slit member 248.

The pointer slit member 248 has a pointer slit 248a extending from a center portion of the pointer slit member 248 radially outward. The pointer slit 248a is a through hole extending through the pointer slit member 248 in the thickness direction. The pointer slit 248a is in a linear shape extending radially outward. In the example, the pointer slit 248a is in a tapered shape reducing in width radially outward.

When the LED 74 is energized, the LED 74 emits light along optical axes 74a. A certain optical axis 74a passes through the pointer slit 248P to form a light flux 74P. The light flux 74P extends toward the dial plate 10 to project a pointer P on the dial plate 10. The drive shaft 84 enables to rotate the pointer slit member 248 to direct the pointer P at an appropriate position relative to the tick marks T and the symbols S on the dial plate 10.

Figure 8:
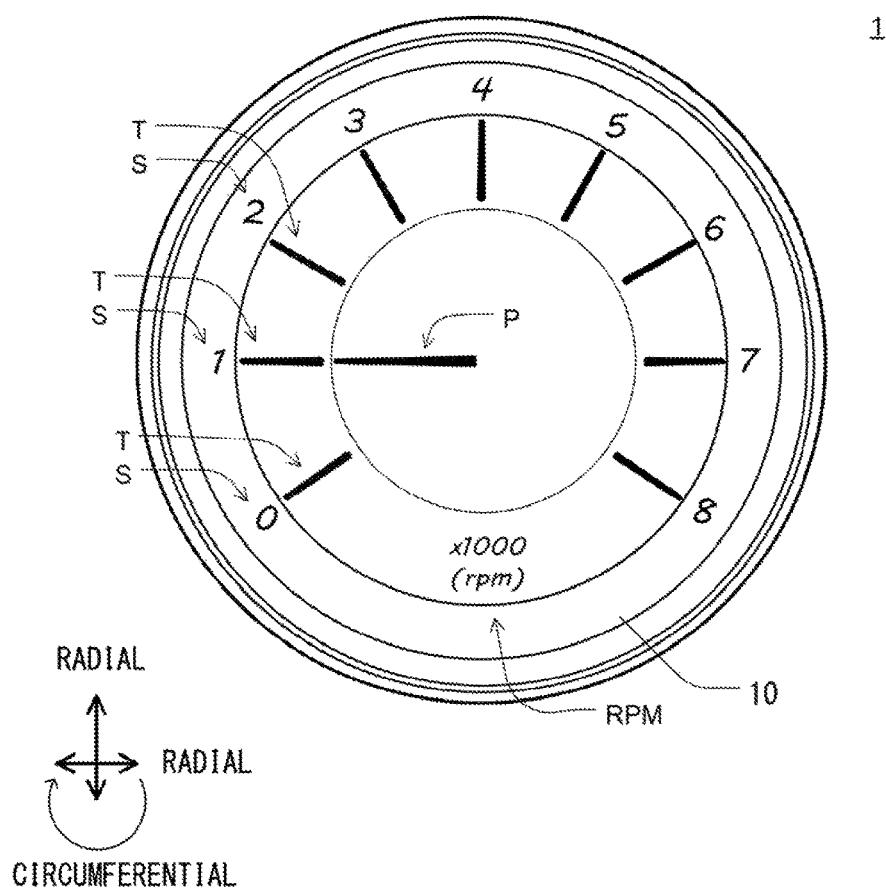
FIG. 8 is a plan view showing the indicating device of the second embodiment when a light source is activated.

As shown in FIG. 8, when the LED 74 emits light through the pointer slit 248a toward the dial center 14 of the dial plate 10, the dial center 14 projects the pointer P, similarly to the symbols S and the tick marks T. As the pointer slit member 248 rotates, the projected pointer P also rotates on the dial center 14 relative to the tick marks T and the symbols S on the dial plate 10.

Figure 9:
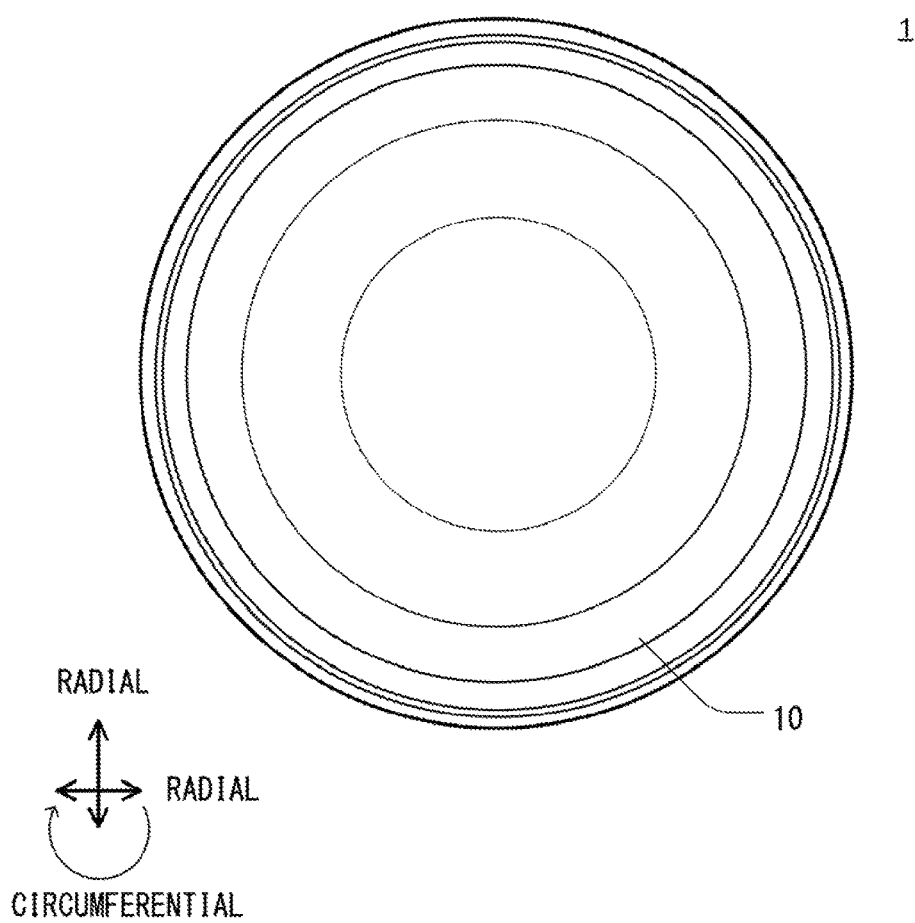
FIG. 9 is a plan view showing the indicating device of the second embodiment when the light source is de-activated.

As shown in FIG. 9, when the controller 100 deactivates the LED 74, the tick marks T, the symbols S, and the pointer P disappear from the dial plate 10. In this state, the dial plate 10 exhibits its totally flat surface showing a blank image.

Other Embodiments

The indicating device may be used in various control panels or instrument panels, such as a speedo meter, fuel meter, or mileage meter, other than the engine revolution meter.

The indicating device may project the tick marks or the symbols. That is, the indicating device may not project the tick marks or the symbols.

The dial plate may be in a flat shape. Specifically, the dial center in the examples may be in a flat disc shape having an entirely flat surface. The slit member may be in a flat shape. Specifically, the conical portion in the examples may be in a flat disc shape having an entirely flat surface.

The tick marks may include primary tick marks and secondary tick marks. The primary tick marks may be greater than the secondary tick marks in width.

The number of the tick marks and the number of the symbols are not limited to the above examples. The number of the tick marks may be increased to form the tick marks with a further fine pitch. The number of the symbols may be also increased to form a precise indicative structure.

The slit is not limited to a through hole extending through the slit member. For example, the slit may be a nonopaque portion or a translucent portion formed in the slit member to extend in the thickness direction of the slit member. In this structure, light emitted from the light source may pass through the slit being nonopaque or translucent.

The dial plate may be partially opaque. For example, a part of the dial center, in which the images are not projected, may be nonopaque.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. An indicating device comprising:
   a dial plate being nonopaque and being in a disc shape;
   a slit member having a plurality of slits each extending through the slit member in a thickness direction; and
   a light source located on an opposite side of the slit member from the dial plate, wherein
   the light source is configured to emit light through the slits of the slit member toward the dial plate to project a plurality of images on the dial plate, wherein
   the slit member is disposed between the dial plate and the light source and is spaced away from both the dial plate and the light source, wherein the plurality of images projected on the dial plate have the same shapes as the plurality of slits.

2. The indicating device according to claim 1, wherein
   the plurality of slits includes tick-mark slits extending radially outward, and
   the images includes tick marks formed by projecting the tick-mark slits on the dial plate.

3. The indicating device according to claim 2, wherein
   the dial plate includes a tick-mark region being nonopaque and being in a disc shape, and
   the tick-mark region is configured to project the tick marks.

4. The indicating device according to claim 3, wherein the tick-mark region is dented in a conical shape.

5. The indicating device according to claim 1, wherein the plurality of slits includes symbol slits each representing a symbol, and the images includes symbols formed by projecting the symbol slits on the dial plate.

6. The indicating device according to claim 5, wherein the dial plate includes a symbol region being nonopaque and being in a ring shape, and the symbol region is configured to project the symbols.

7. The indicating device according to claim 1, wherein the dial plate is configured to cause the images to disappear when the light source is deactivated.

8. The indicating device according to claim 1, further comprising:

a housing in a conical shape, wherein the housing has an opening equipped with the dial plate, and the housing accommodates the slit member and the light source.

9. The indicating device according to claim 1, wherein the light source is in a ring shape and configured to emit light in a ring shape, and the light source is coaxial with the slit member and the dial plate.

10. The indicating device according to claim 9, further comprising:

a light conductor equipped to the light source to direct light emitted from the light source toward the slits.

11. The indicating device according to claim 1, further comprising:

a pointer located at a center of the dial plate and rotational relative to the dial plate, wherein the pointer includes a pointer shaft coaxial with the dial plate and the slit member.

12. The indicating device according to claim 1, wherein the slit member includes a ring slit member and a pointer slit member, the ring slit member is stationary relative to the dial plate, the pointer slit member is rotational relative to the dial plate, the pointer slit member has a pointer slit extending from a center portion of the pointer slit member radially outward, and the light source is configured to emit light through the pointer slit toward the dial plate to project a pointer on the dial plate.

13. The indicating device according to claim 1, further comprising:

a controller configured to control the light source to modify intensity of light emitted from the light source.

* * * * *